United States Patent
Ambrosio et al.

(10) Patent No.: US 7,471,066 B2
(45) Date of Patent: Dec. 30, 2008

(54) BATTERY MANAGEMENT AND EQUALIZATION SYSTEM FOR BATTERIES USING POWER LINE CARRIER COMMUNICATIONS

(75) Inventors: Joseph Mario Ambrosio, Smithtown, NY (US); Konstantinos Sfakianos, Astoria, NY (US)

(73) Assignee: Odyne Corporation, Hauppauge, NY (US)

( * ) Notice: Subject to any disclaimer, the term of this patent is extended or adjusted under 35 U.S.C. 154(b) by 247 days.

(21) Appl. No.: 11/315,927

(22) Filed: Dec. 22, 2005

(65) Prior Publication Data
US 2006/0132089 A1   Jun. 22, 2006

Related U.S. Application Data

(60) Provisional application No. 60/637,887, filed on Dec. 22, 2004, provisional application No. 60/647,934, filed on Jan. 31, 2005.

(51) Int. Cl.
*H02J 7/00* (2006.01)
*H02J 7/02* (2006.01)
*H02J 7/04* (2006.01)

(52) U.S. Cl. .................. 320/119; 320/110; 320/111; 320/112; 320/124; 320/160; 320/162

(58) Field of Classification Search .................. 320/109, 320/110, 111, 112, 119, 124, 150, 152, 157, 320/160, 162
See application file for complete search history.

(56) References Cited

U.S. PATENT DOCUMENTS

| | | | |
|---|---|---|---|
| 4,443,752 A * | 4/1984 | Newman ................... | 320/152 |
| 4,918,690 A | 4/1990 | Markkula, Jr. et al. | |
| 4,941,143 A | 7/1990 | Twitty et al. | |
| 4,955,018 A | 9/1990 | Twitty et al. | |
| 4,969,147 A | 11/1990 | Markkula, Jr. et al. | |
| 5,297,143 A | 3/1994 | Fridrich et al. | |
| 5,319,641 A | 6/1994 | Fridrich et al. | |
| 5,394,089 A | 2/1995 | Clegg | |
| 5,420,572 A | 5/1995 | Dolin, Jr. et al. | |
| 5,500,852 A | 3/1996 | Riley | |
| 5,513,324 A | 4/1996 | Dolin, Jr. et al. | |
| 5,519,878 A | 5/1996 | Dolin, Jr. | |
| 5,568,037 A * | 10/1996 | Massaroni et al. .......... | 320/106 |
| 5,701,068 A * | 12/1997 | Baer et al. ................ | 320/119 |
| 6,037,749 A | 3/2000 | Parsonage | |
| 6,456,041 B1 * | 9/2002 | Terada et al. ............... | 320/132 |
| 6,617,826 B2 * | 9/2003 | Liao et al. .................. | 320/118 |
| 6,882,129 B2 * | 4/2005 | Boskovitch et al. ......... | 320/119 |
| 7,375,492 B2 * | 5/2008 | Calhoon et al. ............. | 320/108 |

* cited by examiner

*Primary Examiner*—Akm E Ullah
*Assistant Examiner*—Johali A Torres Ruiz
(74) *Attorney, Agent, or Firm*—Alfred M. Walker

(57) ABSTRACT

A battery charging system uses power line carrier communications, for communicating battery state information associated with charging batteries, between a battery charger and a battery management system (BMS) located on the battery or battery pack. The power line carrier includes transmitters and receivers transmitting and receiving battery state information, such as current, voltage and temperature, as digital signals on existing cable conductors located between the battery/battery pack and the battery charger. The battery management system (BMS), which is physically located on the battery pack, receives the information from the power line carrier, in order to measure a variety of parameters relating to charging the battery, which may be a motor vehicle battery or a battery for operating machinery, such as fork lifts, bulldozers and other earth moving and product transportation vehicles.

22 Claims, 3 Drawing Sheets

BATTERY MANAGEMENT AND EQUALIZATION SYSTEM FOR BATTERIES USING POWER LINE CARRIER COMMUNICATIONS

CROSS REFERENCE TO RELATED APPLICATIONS

This application claims the benefit, Under 35 U.S.C. 119 (e) of U.S. Provisional Application No. 60/637,887, filed Dec. 22, 2004 and U.S. Provisional Application No. 60/647,934, filed Jan. 31, 2005, which are hereby incorporated by reference.

FIELD OF THE INVENTION

The present invention is related to battery monitoring and charging. More particularly, the present invention is directed to batteries used individually or in a plurality of battery cells connected in a series or parallel configuration. This invention can be applied to batteries in mobile or stationary applications. The invention is applicable to the following battery configurations:
  Individual battery cells
  Batteries (comprised of cells)
  A battery pack comprised of a plurality of batteries electrically connected in series or parallel configuration or a combination of both

BACKGROUND OF THE INVENTION

Those skilled in the art understand the challenges associated with the operation of batteries (of all types and chemistries). Typical problems associated with the use of batteries, which the present invention addresses are:
  Determination of accurate state of charge
  Prediction and Detection of battery failure
  Unbalanced capacity within a plurality of cells or batteries within a battery pack
  Information collection and storage within a battery pack
  Battery module to battery module isolated data collection and equalization
  Control feedback from battery pack to bulk charger Typically the battery management system (BMS) is physically located on the battery pack in order to measure a variety of parameters relating to charging the battery, which may be a motor vehicle battery or a battery for operating machinery, such as fork lifts, and product transportation vehicles.

Such information communicated to a battery charger includes, but is not limited to, current flow in or out, voltages and temperature of one or more batteries or cells within a battery pack.

A difficulty with the typical method of communication between the battery charger and the battery management system (BMS) is that an additional connection is required. Typically a dedicated conductor pair is used to communicate from the battery charger to the battery management system (BMS). Typically only a two-wire connector is required to charge a battery pack, specifically for the positive and negative terminal. The challenge that is presented with the addition of more conductors is that a connector having multiple contacts is required. This addition of hardware adds cost and complexity to the system, since multiple pin connectors are more expensive and more labor intensive to install or maintain.

Moreover, Echelon Systems Corporation of Los Gatos Calif. has developed bi-directional interconnectable sensing and communications chips for communication of message packets of intelligent information cells, which are useful in battery charging management. Among these patents include U.S. Pat. Nos. 4,918,690, 4,941,143, 4,955,018, 4,969,147, 5,297,143, 5,319,641, 5,420,572, 5,500,852, 5,513,324 and 5,519,878.

OBJECTS OF THE INVENTION

An object of the invention is to provide inherent electrical isolation in battery management.

Another object of the invention is to equalize all the battery modules within a battery compartment to reach an equal state of capacity.

Another object of this invention is to provide a flexible number of measurement and equalization nodes as desired by the end user in a battery management system.

It is yet another object to provide a battery management system which provides for accumulation and analysis of historical data relating to battery use.

It is another object of the present invention to provide for accurate charging of batteries.

It is also an object of the present invention to provide a battery management system, which accurately monitors various parameters, such as battery voltage, temperature and current, in order to accurately charge batteries.

It is yet another object to provide battery state of charge data in mobile or stationary battery powered subject matters.

It is a further object of the present invention to be able to ascertain deteriorating or non-functioning components of a battery pack.

It is also an object of the present invention to use a Power Line Carrier (PLC) method to provide digital communications about battery state conditions between a battery management system and a battery charger.

It is also an object to improve over the disadvantages of the prior art.

Other objects which become apparent from the following description of the present invention.

SUMMARY OF THE INVENTION

It is well known that accurate battery management is critical to the operation of batteries. Batteries, which have been configured in a series or parallel configuration, add another level of complexity to accurate battery management. The invention is a battery management system, which monitors various parameters, such as battery voltage, temperature and current. This information is utilized in order to:
  Determine accurate state of charge
  Determine battery state of health
  Predict premature battery failure
  Control bulk battery charging based on individual battery conditions
  Provide data to mobile-based systems such as those found in electric or hybrid electric vehicles.
  Provide data to stationary based systems such as those found in telecommunications, uninterruptible power supplies or battery back-up systems
  Report deteriorating and/or fallen modules within the overall battery pack An object of the invention is the inherent electrical isolation, which is a well understood benefit to those in the industry. The isolation is achieved by using individual measurement and equalization nodes (placed on each battery or battery cell, as required), which communicate over an electrically isolated communication network and take measurements using an isolated voltage measurement technique.

Another object of the invention is the use of a DC equalization bus circuit, which is powered from a central power supply and is connected to the battery via the measurement and equalization node. This node provides a direct connection to the DC equalization bus through a switching network in order to additionally charge batteries, as required, to equalize all the battery modules within a battery compartment to reach an equal state of capacity. The DC equalization bus circuit is powered by the equalization power supply. The DC output of equalization power supply is matched to the voltage range of an individual battery within a series or parallel string.

Another object of this invention is to provide an unlimited number of measurement and equalization nodes. Other battery monitoring systems require that the number of cells is preprogrammed or reconfigured in hardware. The present invention utilizes self-discovery mode, which allows for the addition or removal of measurement and equalization nodes as desired by the end user.

The DC equalization bus can be energized in a variety of ways. Two examples are:
   through the use of a DC to DC converter which reduces the total voltage of the entire series string to the voltage of an individual battery
   through the use of a AC to DC power supply which uses the locally available AC mains and provides the appropriate voltage to charge an individual battery Another object of the invention is the electrical isolation, which exists between power and other components found within the system. One skilled in the art would recognize that safety and functionality are increased through the use of a completely electrically isolated battery management system. Electrically isolated voltage and temperature measurement and equalization is achieved by:
   An isolated communication network based on CAN (Controller Area Network). Those skilled in the art will recognize CAN as an electrically isolated system. The network can be used for nodes, or groups of nodes.
   A nodal system comprised of an electrically isolated voltage and temperature measurement device on each battery module or plurality of modules.
   A common DC power bus which is connected to central power supply which is adequate to charge a single battery cell. The node located on each battery cell is connected in parallel with the said DC power bus in order to add power to each battery as required. The central power supply, which powers the DC equalization bus, can be powered from an AC or DC source.

As an alternative to the isolated communications link, such as CAN, between the battery pack and the bulk charger which may be a distance away from it, a power line carrier (PLC) communications link can be used. The PLC link is also fully isolated and permits bi-directional communications between the battery management system (BMS) and the bulk charger over the charging cables, thereby eliminating the need for a separate communications cable with its attendant connector. To facilitate the PLC link, a PLC modem is embedded within the electronics of both the BMS as well as the bulk charger. Within the PLC modem is a bi-directional PLC communications chip which acts as a transceiver either injecting communications signals onto or extracting signals from the actual high-current charging cables. This PLC communications system can be used for stationary applications such as uninterruptible power supplies (UPS) as well as vehicle or operating machinery battery packs such as for electric or hybrid cars, trucks or busses or for fork lifts. The Power Line Carrier (PLC) communications system can therefore be used to communicate with both on-board or stationary off-board chargers.

This addition of the Power Line Carrier signal communications network over existing cable conductor wiring greatly enhances the battery charging system in general, while allowing the charger to fill the battery pack.

The important information communication function between the battery charger and the battery management system is maintained without additional cable connectors. The synergistic combination of the communication of signals pertaining to battery state information over existing wiring, with the unique Power Line Carrier (PLC) and its transmitters and receivers, provide beneficial effects that are not possible with any other type of battery management system.

The system described in this invention can have a significant effect on cost-control related to battery warranties. The BMS will store historical data on individual batteries denoting the amount of equalization used, individual battery voltage and temperature history, and any error conditions during service or charging. These quality checks determine the ability of a battery to perform according to the manufacturer's warranty and can be used to substantiate cause for replacement or subsidy. This data is also easily stamped with date and time. Besides premature failure that may be due to a manufacturer's defect, the Battery Management System (BMS) can also predict end of battery life, as described by the "complete cycle of life" stated by the manufacturer.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE PREFERRED EMBODIMENTS

Figure 1:
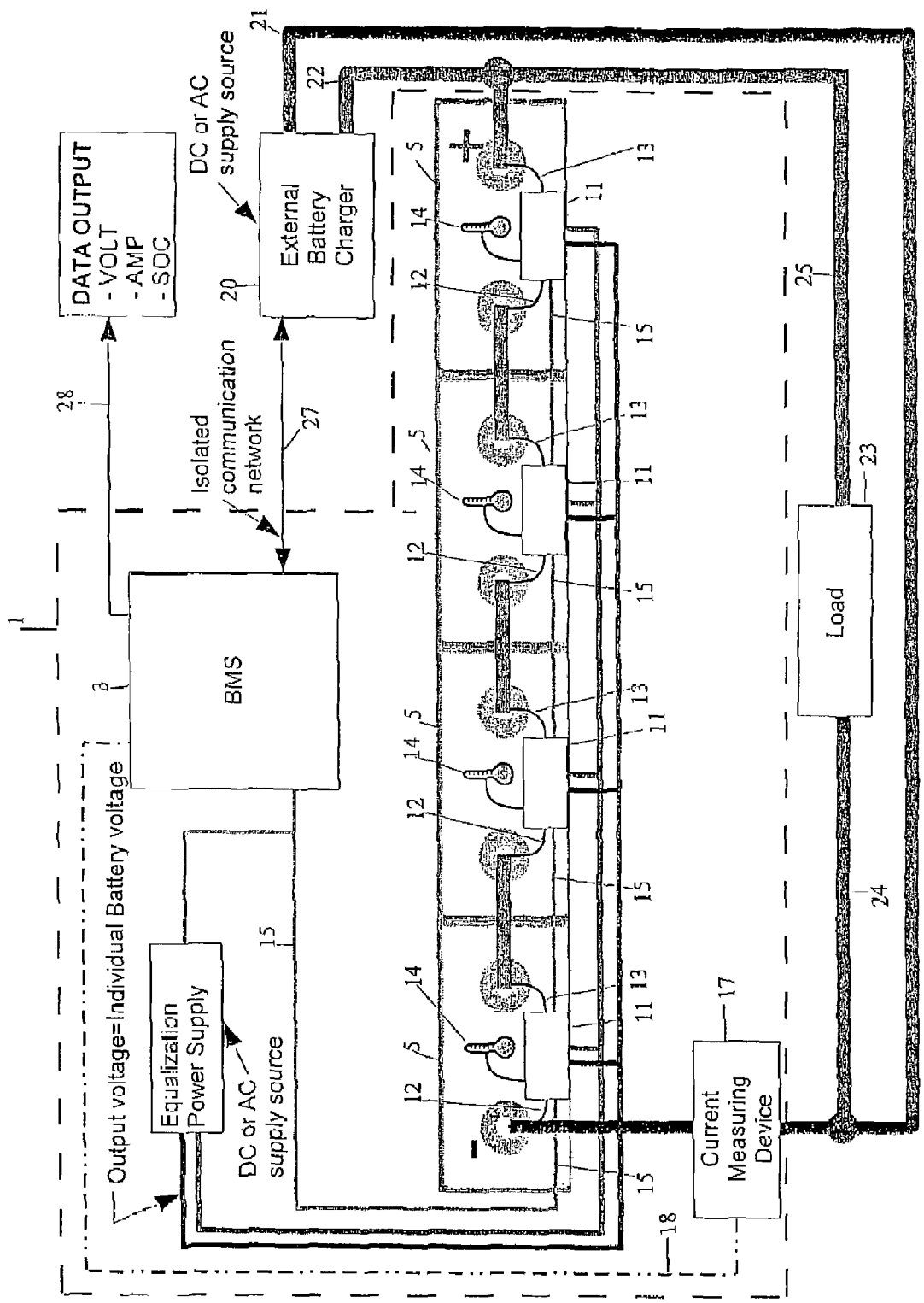
FIG. 1 is a block diagram of the battery management and equalization system of this invention.

FIG. 1 is a block diagram of the battery management and equalization system of this invention. The battery pack 1 is encircled within a dashed line border; it contains several batteries 5 with individual measurement and equalization nodes 11, a central battery management system (BMS), current measurement device 17, an equalization power supply 7, and a variety of lines and busses for communications within battery pack 1 as well as externally. External to battery pack 1 is bulk charger 20 with charging cables 21 and 22, and load 23 with battery cables 24 and 25; also shown is the isolated communications cable 27 between BMS 3 and bulk charger 20 as well as output data line 28 which can provide data such as battery pack voltage, current, and overall state of charge. The latter values are typically displayed to a driver of an electric or hybrid vehicle or to a fork lift driver.

Bulk charger 20 can be powered by AC mains or by an AC or DC source which may be on-board a vehicle. It has built-in intelligence to communicate bi-directionally over cable 27 with BMS 3; BMS 3 sends charge current signals to charger 20, while charger 20 sends signals which may include charger temperature, communications protocol or errors, and stop signals to BMS 3. The appropriate charge current setting sent by BMS 3 is based algorithms appropriate to the battery chemistry. Current measurement device 17 measures the current being supplied to load 23 or current received from charger 20 to the series string of batteries 5 (as shown) or to the entire set of batteries in the pack if a different configuration is used. Line 18 sends this information to BMS 3 which can then compare actual current to the current signal most recently sent to charger 20 for example.

Figure 2:
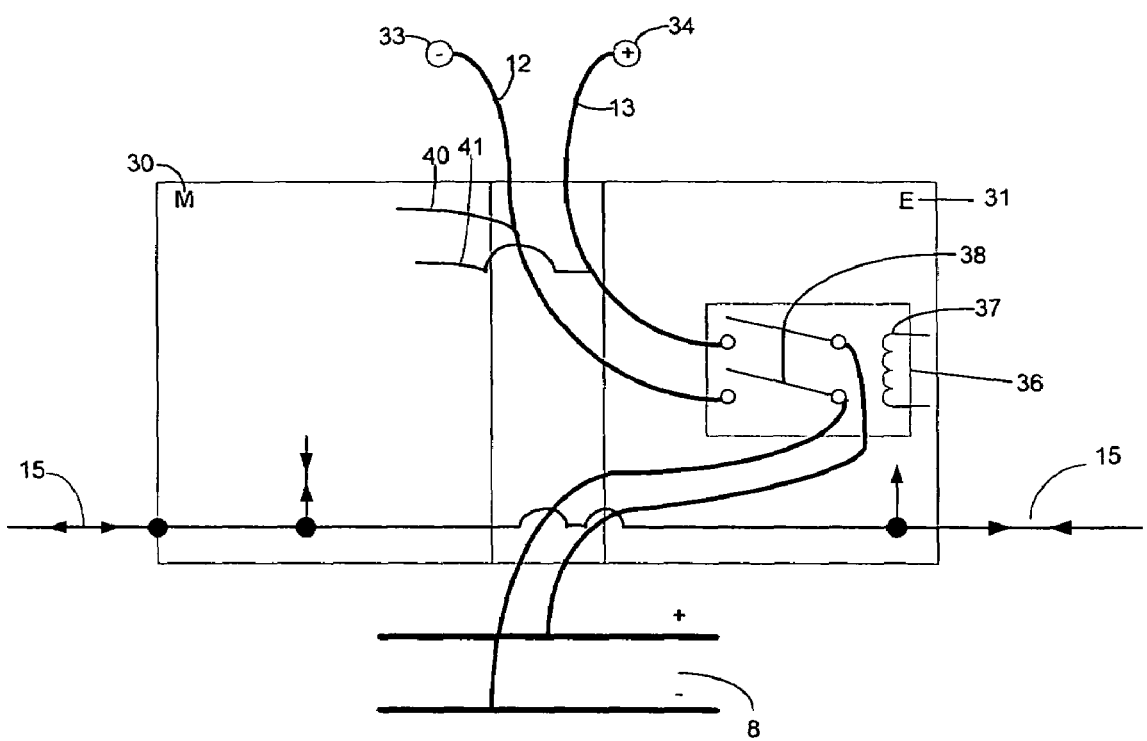
FIG. 2 is a detail block diagram of a single measurement and equalization node showing a relay used to connect a battery to the equalization voltage bus.

FIG. 2 shows some details of a single measurement and isolation node 11. Isolated communications line 15, such as a CAN line, is daisy-chained to all of the measurement and equalization nodes 11, one per battery, to provide operating data on each individual battery to BMS 3 as well as to send an equalization signal to a particular node 11 to connect or disconnect that battery 5 to the equalization bus 8 which carries a charging voltage compatible with a single battery. Equalization power supply 7 is controlled by BMS 3 and may be supplied with AC power or with DC power which may be derived from the battery pack 1 terminal voltage. It is connected to a single battery 5 at a time depending on battery condition as determined by BMS 3 based on information from the corresponding measurement node 11 and the recent historical data on a battery. The connection is via relay 36 as shown in FIG. 2. Here measurement and equalization node 11 is depicted as having a measurement section 30 which accepts temperature readings from probe 14 and voltage readings from voltage sense lines 40 and 41 which are connected to battery leads 12 and 13 leading to battery 5 terminals 33 and 34. Node 11 also has an equalization section 31 which controls relay 36 with operating coil 37 and normally open contacts 38. A solid-state relay or other semiconductor switching devices such as MOSFET's can substitute for electromechanical relay 36 depicted. When relay 36 is energized, equalization current can flow from bus 8 to battery 5 terminals 33 and 34. The duration of the equalization charging period is set by BMS 3 based on algorithms appropriate to the battery chemistry and charge condition. In summary, equalization is achieved through identification of capacity deficient batteries by the BMS with additional charge being provided from the equalization power supply directly to the deficient battery. The BMS controls the sequence and duration of the individual battery equalization based on a predetermined equalization algorithm appropriate to the battery chemistry. If desired, by controlling the equalization power supply, the BMS can also have the ability to charge different batteries at different rates and/or to taper the charging current based on appropriate algorithms. Although equalization is usually performed during bulk charging, there may be operating modes during which it is appropriate as well.

Figure 3:
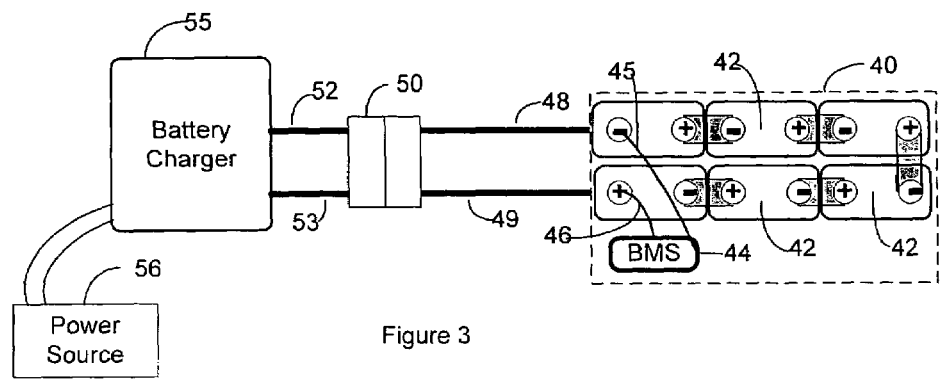
FIG. 3 is a block diagram showing the overall battery management and equalization system of this invention incorporating PLC communications between the battery pack and the bulk charger.

In FIG. 3, power line carrier (PLC) communications has been substituted for isolated communications network line 27 of FIG. 1 linking BMS 3 with bulk charger 20. Here, battery charger 55 with AC or DC power source 56 is connected via charger cables 52 and 53, two-conductor connector 50, and battery cables 48 and 49 to a series string of batteries 42 within battery pack 40. Also within battery pack 40 is BMS 44. In this figure, the details of measurement nodes and equalization (if present) are not shown. In fact, PLC communications is advantageous regardless of the incorporation of the equalization subsystem as described above. Note that BMS 44 has two PLC connections 45 and 46 to battery cables 48 and 49. PLC communications streamlines the network by eliminating a separate communications cable and the task of plugging-in a separate connector which is easily overlooked.

Figure 4:
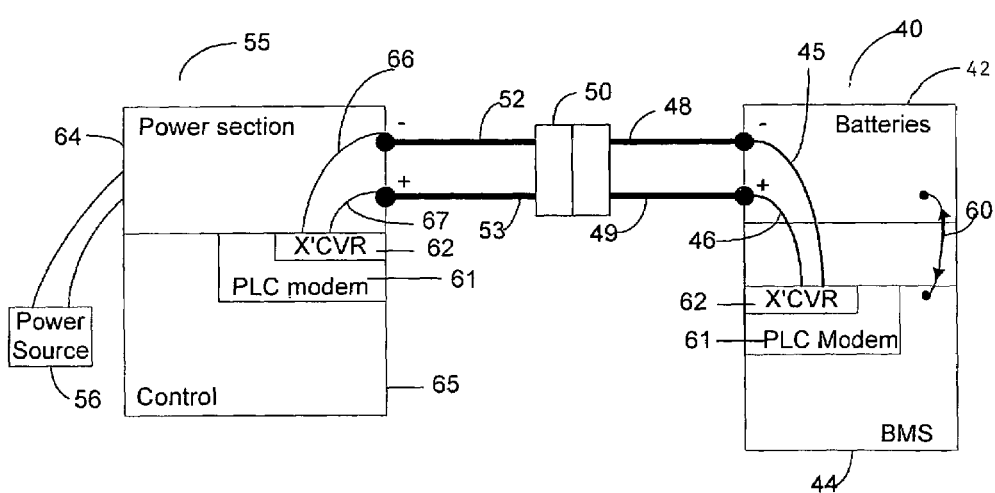
FIG. 4 is a more detailed block diagram of the system of FIG. 3 showing the PLC modems and transceiver chips.

In FIG. 4, there is more communications detail regarding use of PLC. Battery charger 55 is shown as a power section 64 and a control section 65 which contains PLC modem 61 with PLC transceiver chip 62 within. Similarly, battery pack 40 is shown as a battery compartment 42 with BMS 44 as a separate compartment. The middle section can be occupied by the items not detailed such as measurement nodes and equalization subsystem, if included. Note that BMS 44 has an identical PLC modem 61 with PLC transceiver chip 62. Chip 62 is manufactured by a variety of vendors for PLC communications, one example is the Echelon Corporation. The purpose of the PLC modem is to provide an interface between the data sections in BMS 44 or battery charger control section 65 and the chip transceivers 62 which actually modulate the data to be transferred back and forth over the power and battery cables through connector 50. In battery pack 40, isolated communications line 60 denotes the line that communicates with the various measurement nodes among batteries 42, lines 45 and 46 are the bi-directional PLC lines. In charger 55, lines 66 and 67 are the corresponding PLC lines.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A battery charging system comprising:
   at least one battery pack having positive and negative terminals;
   a bulk battery charger having a pair of DC charging wires to said positive and negative terminals for delivering charging current to said at least one battery pack;
   an AC or DC power source for said bulk battery charger;
   a battery management system in said battery pack for controlling said at least one bulk battery charger connected directly to said positive and negative terminals and having means for monitoring relevant state conditions of said battery pack;
   said at least one battery pack being a plurality of batteries in a battery pack, each said battery having a measurement and equalization node communicating with an equalization power supply providing auxiliary power directly to each said battery node when said battery management system determines said battery pack is deficient in charge and while said bulk battery charger is charging said batteries; and,
   an equalization power supply controlled by said battery management system for supplying said auxiliary power to each said battery node.

2. The battery charging system of claim 1 wherein measurement and equalization nodes are expandable to match a predetermined number of said batteries in said battery pack.

3. The battery charging system as in claim 1 wherein said equalization power supply communicates via a bus, carrying a charging voltage compatible with said at least one battery, when said at least one battery is deficient in charge.

4. The battery charging system as in claim 1 wherein said battery management system includes an isolated communications cable located between said battery management system and said bulk charger;
   said battery management system further having an output data line providing battery state data including at least one of battery pack voltage, current, and overall state of charge, said data being displayed to a driver of a vehicle having said battery charging system.

5. The battery charging system as in claim 1 wherein said AC or DC source is on-board a vehicle having said battery charging system.

6. The battery charging system as in claim 1 wherein said bulk battery charger has built-in intelligence communicating bi-directionally over said cable with said battery management system.

7. The battery charging system as in claim 6 wherein said battery management system sends charge current setting request signals based upon algorithms appropriate to battery chemistry to said bulk charger, while said battery charger responds with requested current and/or with other charger parameters which said battery management system interprets to insure a selected algorithm is being followed.

8. The battery charging system as in claim 7 wherein an appropriate charge current setting sent by said bulk battery management system to said bulk battery charger is based upon algorithms appropriate to real-time chemistry of said at least one battery.

9. The battery management system of claim 1 wherein a current measurement device measures current being supplied to a load and/or current received from said battery charger to said plurality of batteries, wherein said measured current information is sent to said battery management system, wherein said battery management system compares actual current to a current signal sent to said battery charger.

10. The battery charging system as in claim 2 wherein each said measurement and isolation node for each said battery includes an isolated communications line, each said measurement and isolation node being daisy-chained to all of each other said measurement and equalization nodes in said battery pack, said isolated communications line providing operating data on each said battery to said battery management system,
said isolated communications line sending at least one equalization signal to a particular node of a respective battery, to connect or disconnect said at least one battery to said equalization bus, which said bus carries a charging voltage compatible with a single battery requiring said charging voltage.

11. The battery charging system as in claim 1 wherein said equalization power supply is controlled by said battery management system and said equalization power supply is powered by at least one of AC power, external DC power and/or internal DC power derived from terminal voltage of said battery pack.

12. The battery charging system as in claim 1 wherein said system is connected to one battery at a time depending on battery condition as determined by said battery management system, based on information from a corresponding equalization and measurement node of said at least one battery and recent historical data of said at least one battery.

13. The battery charging system as in claim 12 wherein said measurement and equalization node includes a measurement section accepting temperature readings from a temperature probe and voltage readings from voltage sensor lines connected to respective battery leads leading to terminals of said at least one battery.

14. The battery charging system as in claim 3 further comprising a relay within each said measurement and equalization node communicating with said equalization power supply bus.

15. The battery charging system as in claim 14 wherein when said relay is energized, equalization current flows from said bus to said terminals of said at least one battery.

16. The battery charging system as in claim 1 wherein said equalization power supply achieves equalization through identification of respective capacity deficient batteries by said battery management system with additional charge being provided from said equalization power supply directly to a respective deficient battery, said battery management system controlling sequence and duration of equalization of said at least one battery, based on a predetermined equalization algorithm appropriate to the chemistry of said at least one battery.

17. The battery charging system as in claim 1 wherein by controlling said equalization power supply, said battery management system charges different batteries at different rates and/or tapers respective charging current.

18. The battery charging system as in claim 1 wherein said battery charger includes a power section and a control section, said control section containing a power line carrier modem with a transceiver chip contained therein.

19. The battery charging system as in claim 1 wherein said battery pack includes a battery compartment and said battery management system as a separate compartment,
said battery management system having a corresponding power line carrier modem with a power line carrier transceiver chip,
said power line carder modem providing an interface between respective data sections in said battery management system and/or said battery charger control section and said chip transceivers modulating said data being transferred back and forth over said pair of DC charging wires connected between said bulk battery charger and at least one battery.

20. A battery charging system comprising:
rechargeable batteries arranged in a pack having positive and negative terminals;
a bulk battery charger having a pair of DC charging wires to said positive and negative terminals for delivering charging current to said batteries;
an AC or DC power source for said bulk battery charger;
a battery management system within said pack of rechargeable batteries for controlling said bulk battery charger connected to said positive and negative terminals having means for monitoring relevant state conditions of said batteries; and
a DC equalization bus circuit for said batteries, said circuit being powered from a central equalization power supply and being connected to said batteries via a measurement and equalization node associated with each battery, said node providing a direct connection to a DC equalization bus through a switching network charging said batteries to equalize all said batteries to reach an equal state of capacity; said DC equalization bus circuit being powered by said equalization power supply operating during bulk charging of said at least one battery, said DC output of said equalization power supply being matched to a predetermined voltage range of an individual battery within a series or series-parallel string of said plurality of batteries.

21. The battery charging system as in claim 20 wherein said DC equalization bus is energized by at least one of:
a) A DC to DC converter reducing the total voltage of said plurality of batteries to a voltage of an individual battery.
b) An AC to DC power supply using locally available AC mains and providing appropriate voltage to charge said at least one battery.

22. The battery charging system of claim 21 wherein electrically isolated voltage and temperature measurement is measured by at least one of:
a) an isolated communication network based on CAN (Controller Area Network):
b) a nodal system including an electrically isolated voltage and temperature measurement device on each said battery; and,
c) a common DC power bus connected to a central power supply which is adequate to charge a single battery cell of said plurality of batteries, a respective node located on each said battery cell being connected in parallel with said DC power bus in order to add power to each said at least one battery as required.

* * * * *